United States Patent [19]
Morgan

[11] Patent Number: 5,873,763
[45] Date of Patent: Feb. 23, 1999

[54] CUP ON WHEELS

[75] Inventor: Mathew David Morgan, Kiama Downs, Australia

[73] Assignee: AS Promotional Partners Pty Limited, North Sydney, Australia

[21] Appl. No.: 854,990

[22] Filed: May 13, 1997

[51] Int. Cl.[6] .................. A63H 7/02; A63H 17/42; B62D 39/00; B60T 1/00
[52] U.S. Cl. ............... 446/78; 446/74; 446/269; 446/431; 280/33.991; 248/129; 188/4 R
[58] Field of Search ................ 446/71, 73, 74, 446/76, 78, 269, 431, 464, 470; 280/33.991–33.994; 248/98, 129; 188/4 R, 19, 9, 15, 25

[56] References Cited

U.S. PATENT DOCUMENTS

| | | | |
|---|---|---|---|
| 1,401,350 | 12/1921 | Monahan | 188/4 R |
| 3,217,839 | 11/1965 | Watkins et al. | 188/4 R |
| 3,777,392 | 12/1973 | Span et al. | 446/78 |
| 3,791,550 | 2/1974 | Duncan | 220/23.86 |
| 3,968,591 | 7/1976 | Pearson, Jr. | 446/27 |
| 3,992,042 | 11/1976 | Helmick et al. | 188/4 R |
| 4,055,234 | 10/1977 | Burton | 280/11.2 |
| 4,295,293 | 10/1981 | Baclit | 446/78 |
| 4,403,441 | 9/1983 | White et al. | 446/78 |
| 5,380,023 | 1/1995 | McBee | 280/87.01 |
| 5,383,536 | 1/1995 | Butter et al. | 188/1.12 |
| 5,523,161 | 6/1996 | Issacs et al. | 428/34.1 |
| 5,655,303 | 8/1997 | Janczak | 30/326 |

Primary Examiner—Robert A. Hafer
Assistant Examiner—Laura Fossum
Attorney, Agent, or Firm—Panitch Schwarze Jacobs & Nadel, P.C.

[57] ABSTRACT

A movable container which includes a body with a lower portion, a middle portion, and a top portion. The top portion includes a cup, and at least one wheel is rotatably mounted on the lower portion of the body. The wheel contacts a support surface and rotates relative to the body causing the cup to move along the support surface. A brake system is mounted on the body adjacent the at least one wheel for engaging the at least one wheel and restricting rotation the wheel.

6 Claims, 5 Drawing Sheets ns.

CUP ON WHEELS

BACKGROUND OF THE INVENTION

This invention relates to a novelty and more particularly a novelty cup on wheels.

In the area of children's products, it is common for products such as cups to be stylised so as to carry either two or three dimensional characters so as to make the products more appealing to consumers.

In an attempt to provide a cup or the like with more appeal, the present invention provides a novelty device comprising an eating or drinking utensil mounted on a plurality of wheels for motion.

SUMMARY OF THE INVENTION

The provision of wheels enables a child to roll the device along the ground, thereby increasing its appeal. It also enables the cup to be equally moved from one location to another. Preferably, the utensil is a cup or mug and preferably the utensil is mounted on four wheels. Preferably the device is provided with one or more handles to enable a user to pick it up, more preferably mounted on the utensil.

Preferably there is provided brake means for engaging one or more of the wheels, so as to prevent the device rolling, such as when it is filled with liquid.

The brake means is preferably slideably mounted on the handle of the utensil and slides between two wheels to lock them. Alternatively, the brake means may be provided separately from the handle or the utensil. Alternate brake mechanisms may be provided to limit rotation of the wheels. The brake mechanism may pivot between its operative and inoperative positions. Alternatively, the brake may be a ratchet type device which restricts but does not entirely prevent movement.

BRIEF DESCRIPTION OF THE SEVERAL VIEWS OF THE DRAWINGS

The invention shall be better understood from the following non-limiting description of an embodiment of the invention and the drawings, in which.

DETAILED DESCRIPTION OF THE INVENTION

Figure 1:
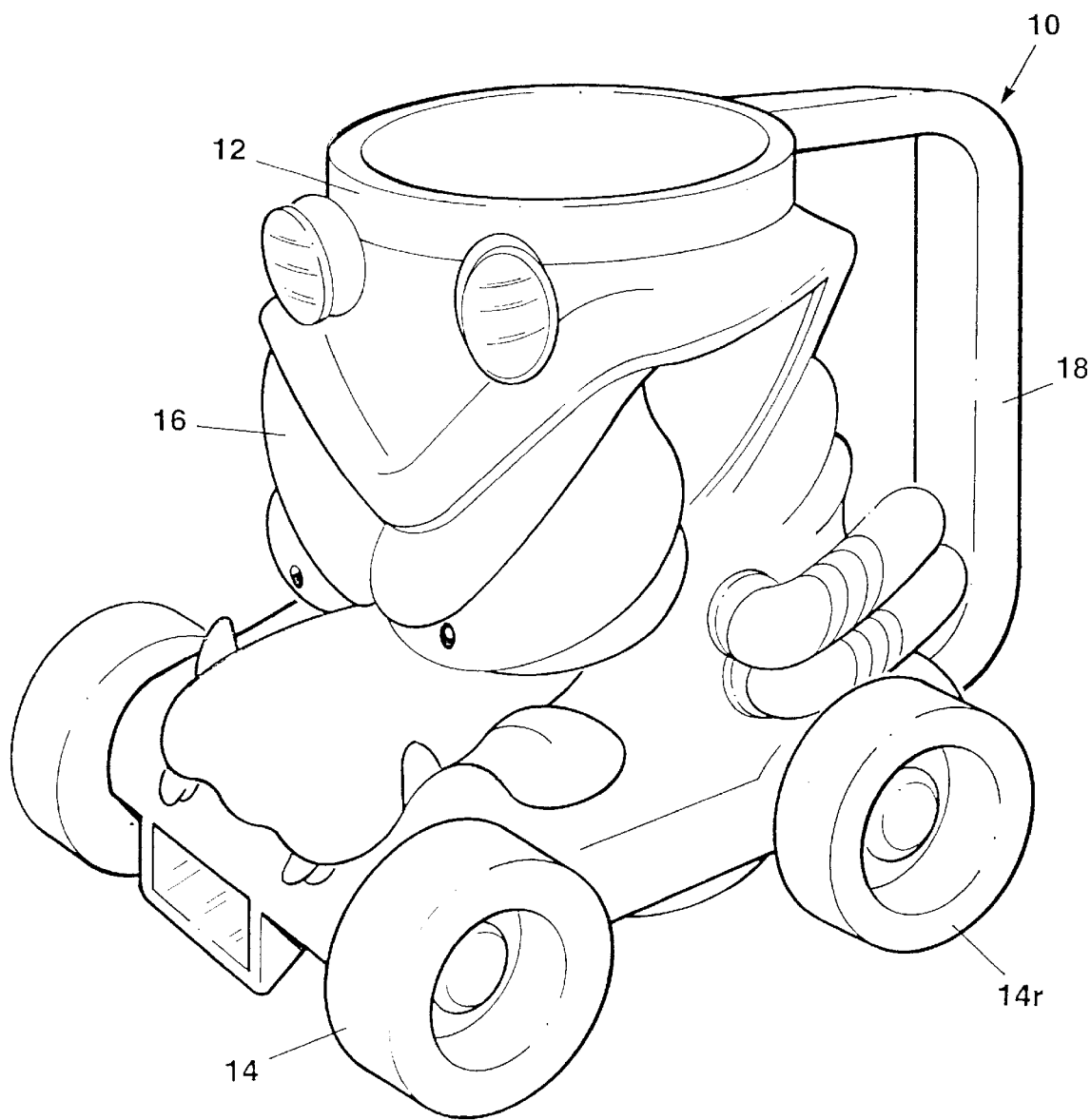
FIG. 1 shows a first embodiment of the invention.
Figure 2:
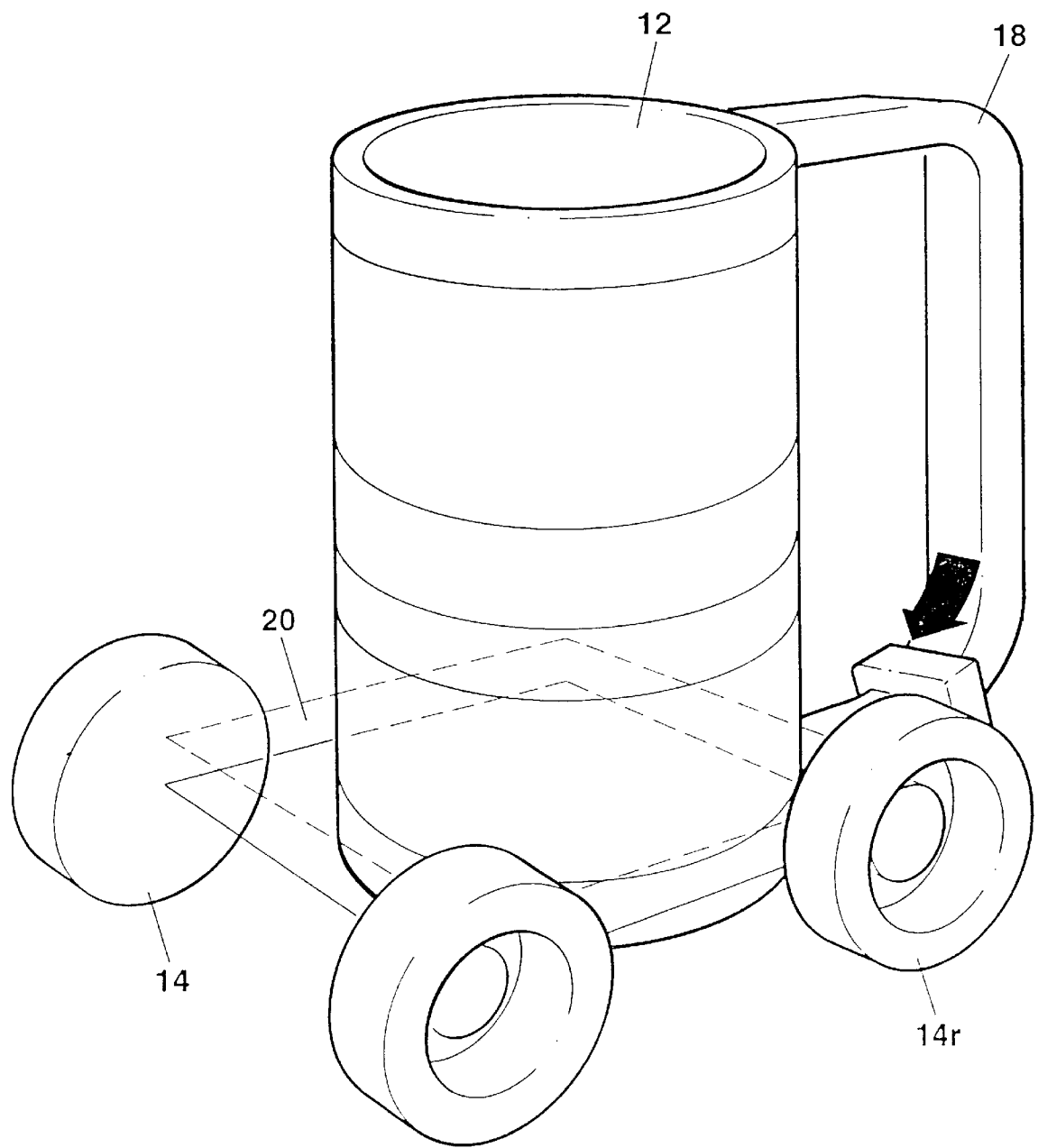
FIG. 2 shows a partial layout of the FIG. 1 device.
Figure 3:
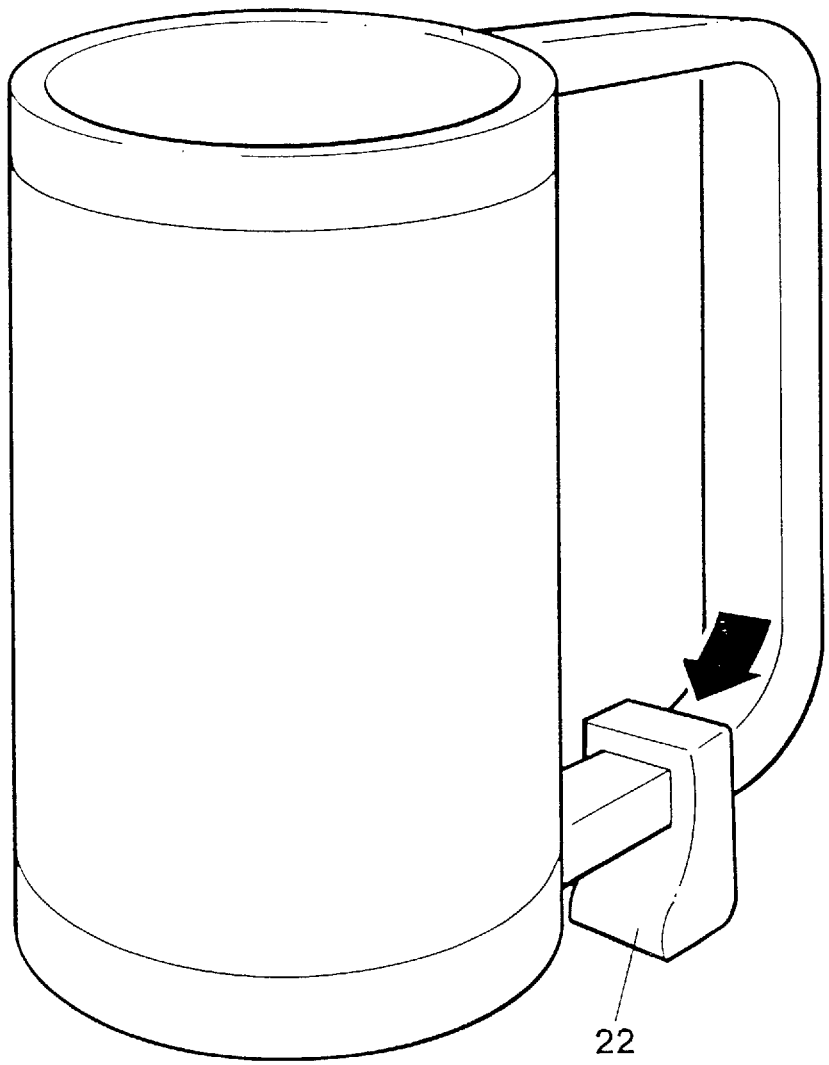
FIG. 3 shows a further partial layout of the FIG. 1 device.
Figure 4:
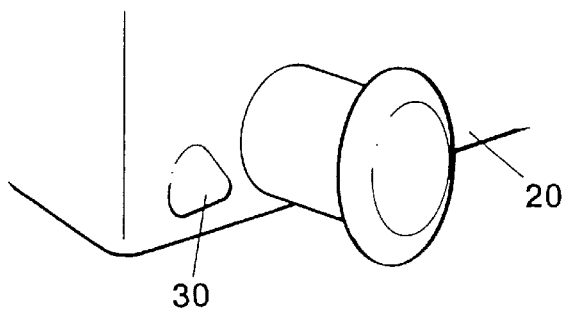
FIG. 4 shows a perspective view of an alternate braking arrangement.
Figure 5:
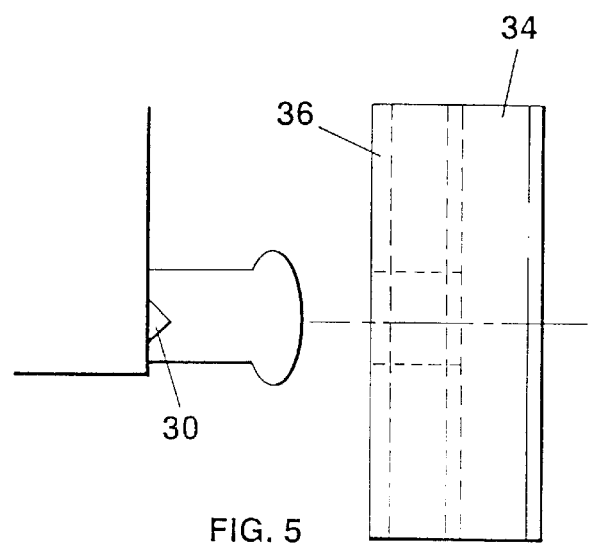
FIG. 5 is an end view of the braking arrangement of FIG. 4.
Figure 6:
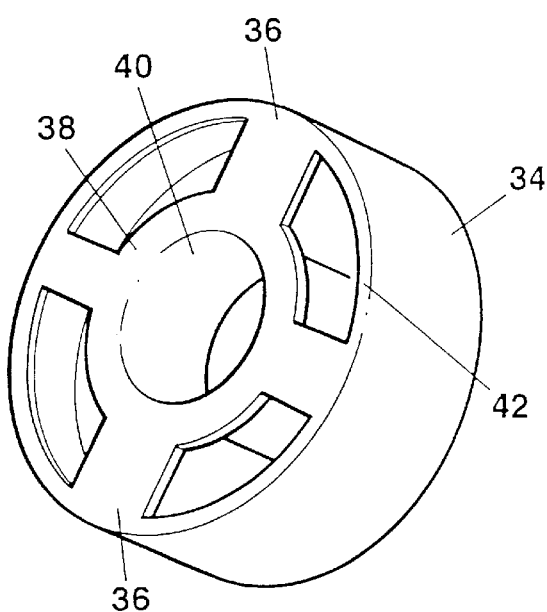
FIGS. 6 & 7 are perspective views of a wheel for use with the braking arrangement of FIGS. 4 & 5.
Figure 7:
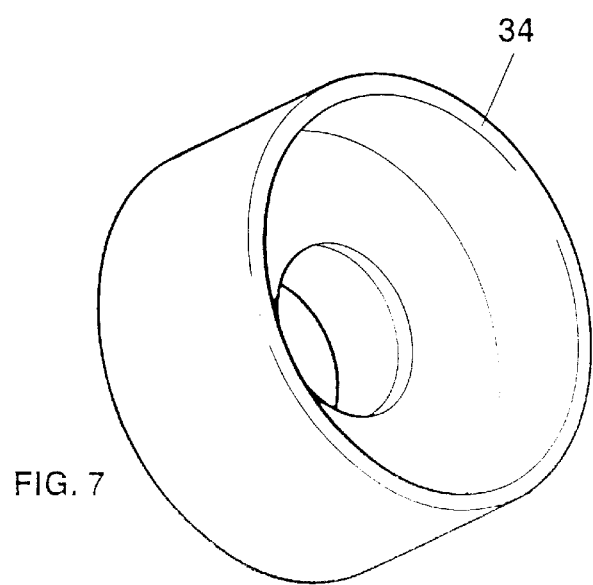

Referring to the drawings, there is shown a novelty device 10 which comprises a cup 12, a plurality of wheels 14 and a three dimensional character 16, all of which are comprised of a plastics material.

The cup 12 is preferably manufactured by injection moulding and is formed integral with its handle 18 and a base 20 for the wheels 14. Wheels 14 may then be formed separately and attached to the base 20 by conventional methods.

The character 16 is preferably moulded separately from the cup 12, so that many different characters may be utilised with a single style of cup/base unit.

In the embodiment show there are four wheels 14, arranged at the corners of the base 20. The handle 18 of the cup extends in a D shape from adjacent the top of the cup to adjacent its base, approximately in line with the rear wheels 14r.

The handle has a non-circular cross-section, preferably square or rectangular, which, at least at its base, is of constant cross-section. Slideably mounted on the handle 18 is a rubber or plastic brake member 22.

The relationship of the cup, handle and rear wheels is such that the base of the handle is generally in line with the rear wheels. The brake member 22 has a width slightly greater than the distance between the rear wheels 14r. The brake member 22 may be slid along handle 18 toward the front of the device so as to jamb between the two rear wheels and so preventing them rotating. Thus, the device is prevented from rolling.

The brake member 22 may be slid rearwards, away from the wheels 14 so allowing them to rotate and allowing the device to roll along the ground.

As an alternative, the brake member 22 may engage only one wheel, rather than two although this is less effective.

As a further alternative, the brake member need not be mounted on the handle, but may be mounted on a separate rod, for instance, to one side of the device so as to engage one or both wheels on one side of the device. The brake member may slide along the rod or be fixed to the rod with the rod rotating between an engaged and a disengaged position.

A further brake arrangement is shown in FIGS. 4 to 7, in which the base 20 may provided with a raised brake member 30 adjacent the stub axle 32 of one or more of the wheels 34. Wheels having spokes 36 on their inner surface 38 are required. The wheels 34 and the position of the brake member 30 are arranged so that the brake member lies between the wheel hub 40 and the tread 42.

Thus as the wheels rotate the brake member will alternatively engage a spoke and then not engage a spoke. The wheel 34 is made of a plastics material so the spokes 36 will bend out of the way of the brake member 30 as the wheel 34 rotates. As a further alternative, the brake member may intermittently engage a circumferentially extending surface of the wheel, such as the tread area.

Figure 8:
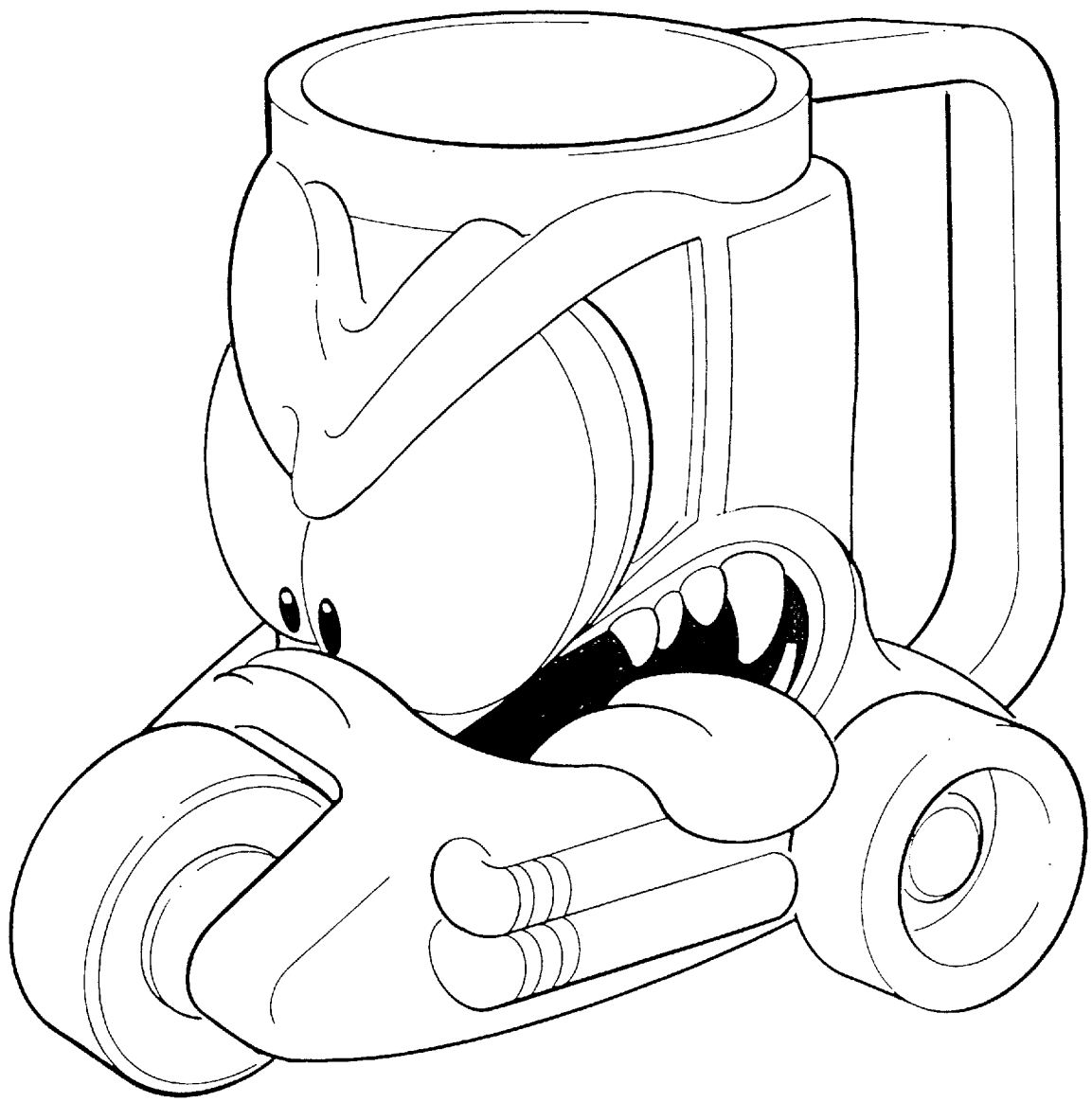
FIG. 8 is a three wheeled embodiment of the invention.

FIG. 8 shows a variation of the invention, in which the framework is provided with only 3, as opposed to 4 wheels. In this version, there are two wheels at the rear of the framework with the handle extending between them as per the FIG. 1 device. A brake member (not shown) similar to the FIG. 1 device is also used.

It will be appreciated that many modifications and variations may be made to the embodiment described herein by those skilled in the art without departing from the spirit or scope of the invention.

I claim:

1. A movable container comprising:
   a. a body having a lower portion, a middle portion, and a top portion, the top portion including a drinking cup;
   b. at least one wheel rotatably mounted to the lower portion of the body wherein the wheel is adapted to contact a support surface and rotate relative to the body such that the cup moves along the support surface; and
   c. brake means mounted to the body adjacent to the at least one wheel for restricting rotation of the at east one wheel, wherein an elongate support member is attached to the body and the brake means comprises a brake member slidably mounted on the elongate support member and movable along the support member between an operative position, wherein the brake member contacts the at least one wheel to restrict rotation thereof, and an inoperative position, wherein the brake member is remote from the at least one wheel.

2. A movable container according to claim 1 wherein there are two spaced apart wheels having side walls, the wheels being parallel and mounted for rotation about a common axis on either side of the support member, whereby the brake member engages the side walls of the two wheels in the operative position.

3. A movable container according to claim 2 wherein the drinking cup has a D-shaped handle, and the handle is the support member.

4. A movable container according to claim 1 wherein there are two wheels, each wheel having tread and being mounted on separate, parallel non-coaxial axes located on either side of the elongate support member, and the brake member is adapted to engage the tread of at least one wheel in the operative position.

5. A movable container according to claim 4 wherein the drinking cup has a D-shaped handle, and the handle is the support member.

6. A movable container comprising:
 a. a body having a lower portion, a middle portion, and a top portion, the top portion including a drinking cup;
 b. at least one wheel rotatable mounted to the lower portion of the body wherein the wheel is adapted to contact a support surface and rotate relative to the body such that the cup moves along the support surface and wherein the at least one wheel has spokes and tread; and
 c. brake means for restricting rotation of the at least one wheel comprising a brake member mounted to the body adjacent to the at least one wheel, whereby the brake member is adapted to intermittently contact one of the spokes and the tread of the at least one wheel to stop rotation.

* * * * *